(12) United States Patent
Weerawarna et al.

(10) Patent No.: US 7,717,995 B2
(45) Date of Patent: *May 18, 2010

(54) METHODS FOR THE PREPARATION OF MIXED POLYMER SUPERABSORBENT FIBERS CONTAINING CELLULOSE

(75) Inventors: S. Ananda Weerawarna, Seattle, WA (US); Bing Su, Federal Way, WA (US)

(73) Assignee: Weyerhaeuser NR Company, Federal Way, WA (US)

(*) Notice: Subject to any disclaimer, the term of this patent is extended or adjusted under 35 U.S.C. 154(b) by 822 days.

This patent is subject to a terminal disclaimer.

(21) Appl. No.: 11/537,912

(22) Filed: Oct. 2, 2006

(65) Prior Publication Data

US 2008/0079187 A1 Apr. 3, 2008

(51) Int. Cl.
*C08L 1/32* (2006.01)

(52) U.S. Cl. .................. 106/140.2; 106/144.3; 536/43; 536/52

(58) Field of Classification Search ............... 106/140.2, 106/144.3; 536/56, 66, 84, 114, 124
See application file for complete search history.

(56) References Cited

U.S. PATENT DOCUMENTS

| | | | |
|---|---|---|---|
| 3,645,836 A | 2/1972 | Torr | |
| 4,028,290 A | 6/1977 | Reid | |
| 4,125,493 A * | 11/1978 | Posiviata et al. | 524/35 |
| 4,128,692 A | 12/1978 | Reid | |
| 4,143,163 A | 12/1978 | Reid | |
| 4,273,118 A | 6/1981 | Smith | |
| 4,319,956 A | 3/1982 | Snyder et al. | |
| 4,605,401 A | 8/1986 | Chemilir et al. | |
| 4,624,868 A | 11/1986 | Muller | |
| 4,693,713 A | 9/1987 | Chmelir | |
| 4,952,550 A | 8/1990 | Wallach et al. | |
| 4,959,341 A | 9/1990 | Wallach | |
| 5,231,122 A | 7/1993 | Palumbo et al. | |
| 5,425,725 A | 6/1995 | Tanzer et al. | |
| 5,470,964 A | 11/1995 | Qin | |
| 5,498,705 A | 3/1996 | Qin | |
| 5,550,189 A | 8/1996 | Qin et al. | |
| 5,612,411 A | 3/1997 | Gross | |
| 5,688,776 A | 11/1997 | Bauer et al. | |
| 5,736,595 A | 4/1998 | Gunther et al. | |
| 5,801,116 A | 9/1998 | Cottrell et al. | |
| 5,847,031 A | 12/1998 | Klimmek et al. | |
| 6,162,541 A | 12/2000 | Chou et al. | |
| 6,296,936 B1 | 10/2001 | Yahiaoui et al. | |
| 6,331,619 B1 | 12/2001 | Besemer et al. | |
| 6,562,743 B1 | 5/2003 | Cook et al. | |
| 6,689,934 B2 | 2/2004 | Dodge, II et al. | |
| 6,713,460 B2 | 3/2004 | Huppe | |
| 6,765,042 B1 | 7/2004 | Thornton et al. | |
| 6,846,924 B1 * | 1/2005 | Malmgren et al. | 536/124 |
| 6,998,367 B2 | 2/2006 | Qin | |
| 7,306,039 B2 | 12/2007 | Wang et al. | |
| 7,321,007 B2 | 1/2008 | Gagliardi et al. | |
| 7,407,912 B2 | 8/2008 | Mertens et al. | |
| 2003/0027787 A1 | 2/2003 | Couture | |
| 2003/0068944 A1 | 4/2003 | Carlucci et al. | |
| 2003/0144642 A1 | 7/2003 | Dopps et al. | |
| 2003/0232965 A1 | 12/2003 | Bergeron | |
| 2004/0024092 A1 | 2/2004 | Sorens et al. | |
| 2004/0236260 A1 | 11/2004 | Griffiths et al. | |
| 2005/0214541 A1 | 9/2005 | Berrada et al. | |
| 2006/0142477 A1 | 6/2006 | Glasser | |
| 2006/0147689 A1 | 7/2006 | Wallajapet et al. | |
| 2007/0179291 A1 | 8/2007 | Thibodeau et al. | |
| 2008/0009616 A1 | 1/2008 | Frank et al. | |
| 2008/0078514 A1 | 4/2008 | Weerawarna et al. | |
| 2008/0078515 A1 | 4/2008 | Weerawarna et al. | |
| 2008/0079187 A1 | 4/2008 | Weerawarna et al. | |
| 2008/0079188 A1 | 4/2008 | Weerawarna et al. | |
| 2008/0081165 A1 | 4/2008 | Weerawarna et al. | |
| 2008/0081189 A1 | 4/2008 | Weerawarna et al. | |
| 2008/0081190 A1 | 4/2008 | Weerawarna et al. | |
| 2008/0081191 A1 | 4/2008 | Weerawarna et al. | |
| 2008/0081843 A1 | 4/2008 | Weerawarna et al. | |
| 2008/0082064 A1 | 4/2008 | Luo et al. | |
| 2008/0082065 A1 | 4/2008 | Weerawarna et al. | |
| 2008/0082067 A1 | 4/2008 | Weerawarna et al. | |

FOREIGN PATENT DOCUMENTS

| | | |
|---|---|---|
| WO | WO 00/21581 | 4/2000 |
| WO | WO 2005/123781 | 12/2005 |
| WO | WO 2006/079221 | 8/2006 |
| WO | WO 2006/119638 | 11/2006 |

* cited by examiner

*Primary Examiner*—Peter Szekely
(74) *Attorney, Agent, or Firm*—John M. Crawford (57) ABSTRACT

A method for making mixed polymer composite fibers containing cellulose fibers in which cellulose fibers are dispersed in an aqueous solution comprising a carboxyalkyl cellulose and a galactomannan polymer or a glucomannan polymer in water to provide an aqueous fiber dispersion; the aqueous dispersion treated with a first crosslinking agent to provide a gel; the gel mixed with a water-miscible solvent to provide composite fibers; and the composite fibers treated with a second crosslinking agent to provide crosslinked fibers.

20 Claims, 3 Drawing Sheets

METHODS FOR THE PREPARATION OF MIXED POLYMER SUPERABSORBENT FIBERS CONTAINING CELLULOSE

BACKGROUND OF THE INVENTION

Personal care absorbent products, such as infant diapers, adult incontinent pads, and feminine care products, typically contain an absorbent core that includes superabsorbent polymer particles distributed within a fibrous matrix. Superabsorbents are water-swellable, generally water-insoluble absorbent materials having a high absorbent capacity for body fluids. Superabsorbent polymers (SAPs) in common use are mostly derived from acrylic acid, which is itself derived from petroleum oil, a non-renewable raw material. Acrylic acid polymers and SAPs are generally recognized as not being biodegradable. Despite their wide use, some segments of the absorbent products market are concerned about the use of non-renewable petroleum oil derived materials and their non-biodegradable nature. Acrylic acid based polymers also comprise a meaningful portion of the cost structure of diapers and incontinent pads. Users of SAP are interested in lower cost SAPs. The high cost derives in part from the cost structure for the manufacture of acrylic acid which, in turn, depends upon the fluctuating price of petroleum oil. Also, when diapers are discarded after use they normally contain considerably less than their maximum or theoretical content of body fluids. In other words, in terms of their fluid holding capacity, they are "over-designed". This "over-design" constitutes an inefficiency in the use of SAP. The inefficiency results in part from the fact that SAPs are designed to have high gel strength (as demonstrated by high absorbency under load or AUL). The high gel strength (upon swelling) of currently used SAP particles helps them to retain a lot of void space between particles, which is helpful for rapid fluid uptake. However, this high "void volume" simultaneously results in there being a lot of interstitial (between particle) liquid in the product in the saturated state. When there is a lot of interstitial liquid the "rewet" value or "wet feeling" of an absorbent product is compromised.

In personal care absorbent products, U.S. southern pine fluff pulp is commonly used in conjunction with the SAP. This fluff is recognized worldwide as the preferred fiber for absorbent products. The preference is based on the fluff pulp's advantageous high fiber length (about 2.8 mm) and its relative ease of processing from a wetland pulp sheet to an airlaid web. Fluff pulp is also made from renewable and biodegradable cellulose pulp fibers. Compared to SAP, these fibers are inexpensive on a per mass basis, but tend to be more expensive on a per unit of liquid held basis. These fluff pulp fibers mostly absorb within the interstices between fibers. For this reason, a fibrous matrix readily releases acquired liquid on application of pressure. The tendency to release acquired liquid can result in significant skin wetness during use of an absorbent product that includes a core formed exclusively from cellulosic fibers. Such products also tend to leak acquired liquid because liquid is not effectively retained in such a fibrous absorbent core.

Superabsorbent produced in fiber form has a distinct advantage over particle forms in some applications. Such superabsorbent fiber can be made into a pad form without added non superabsorbent fiber. Such pads will also be less bulky due to elimination or reduction of the non superabsorbent fiber used. Liquid acquisition will be more uniform compared to a fiber pad with shifting superabsorbent particles.

A need therefore exists for a fibrous superabsorbent material that is simultaneously made from a biodegradable renewable resource like cellulose that is inexpensive. In this way, the superabsorbent material can be used in absorbent product designs that are efficient. These and other objectives are accomplished by the invention set forth below.

SUMMARY OF THE INVENTION

The invention provides a method for making mixed polymer composite fibers containing cellulose. The method includes the steps of dispersing cellulose fibers in an aqueous solution comprising a carboxyalkyl cellulose and a galactomannan polymer or a glucomannan polymer in water to provide an aqueous fiber dispersion; treating the aqueous dispersion with a first crosslinking agent to provide a gel; mixing the gel with a water-miscible solvent to provide composite fibers; and treating the composite fibers with a second crosslinking agent to provide crosslinked fibers.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

The present invention provides methods for making the mixed polymer composite fiber.

The mixed polymer composite fiber is a fiber comprising a carboxyalkyl cellulose, a galactomannan polymer or a glucomannan polymer, and cellulose. The carboxyalkyl cellulose, which is mainly in the sodium salt form, can be in other salts forms such as potassium and ammonium forms. The mixed polymer composite fiber is formed by intermolecular crosslinking of mixed polymer molecules, and is water insoluble and water-swellable.

In one aspect, the present invention provides a mixed polymer composite fiber that further includes cellulose. As used herein, the term "mixed polymer composite fiber" refers to a fiber that is the composite of at least three different polymers (i.e., mixed polymer). The mixed polymer composite fiber is a homogeneous composition that includes two associated water-soluble polymers: (1) a carboxyalkyl cellulose and (2) either a galactomannan polymer or a glucomannan polymer.

The carboxyalkyl cellulose useful in making the mixed polymer composite fiber has a degree of carboxyl group substitution (DS) of from about 0.3 to about 2.5. In one embodiment, the carboxyalkyl cellulose has a degree of carboxyl group substitution of from about 0.5 to about 1.5.

Although a variety of carboxyalkyl celluloses are suitable for use in making the mixed polymer composite fiber, in one embodiment, the carboxyalkyl cellulose is carboxymethyl cellulose. In another embodiment, the carboxyalkyl cellulose is carboxyethyl cellulose.

The carboxyalkyl cellulose is present in the mixed polymer composite fiber in an amount from about 60 to about 99% by weight based on the weight of the mixed polymer composite fiber. In one embodiment, the carboxyalkyl cellulose is present in an amount from about 80 to about 95% by weight based on the weight of the mixed polymer composite fiber. In addition to carboxyalkyl cellulose derived from wood pulp containing some carboxyalkyl hemicellulose, carboxyalkyl cellulose derived from non-wood pulp, such as cotton linters, is suitable for preparing the mixed polymer composite fiber. For carboxyalkyl cellulose derived from wood products, the mixed polymer fibers include carboxyalkyl hemicellulose in an amount up to about 20% by weight based on the weight of the mixed polymer composite fiber.

The galactomannan polymer useful in making the mixed polymer composite fiber can include any one of a variety of galactomannan polymers. In one embodiment, the galactomannan polymer is guar gum. In another embodiment, the galactomannan polymer is locust bean gum. In a further embodiment, the galactomannan polymer is tara gum.

The glucomannan polymer useful in making the mixed polymer composite fiber can include any one of a variety of glucomannan polymers. In one embodiment, the glucomannan polymer is konjac gum. In another embodiment, the galactomannan polymer is locust bean gum. In a further embodiment, the galactomannan polymer is tara gum.

The galactomannan polymer or glucomannan polymer is present in an amount from about 1 to about 20% by weight based on the weight of the mixed polymer composite fiber. In one embodiment, the galactomannan polymer or glucomannan polymer is present in an amount from about 1 to about 15% by weight based on the weight of the mixed polymer composite fiber.

The cellulose is present in an amount from about 2 to about 15% by weight based on the weight of the mixed polymer composite fiber. In one embodiment, the cellulose is present in an amount from about 5 to about 10% by weight based on the weight of the mixed polymer composite fiber.

Although available from other sources, suitable cellulosic fibers are derived primarily from wood pulp. Suitable wood pulp fibers for use with the invention can be obtained from well-known chemical processes such as the kraft and sulfite processes, with or without subsequent bleaching. Pulp fibers can also be processed by thermomechanical, chemithermomechanical methods, or combinations thereof. A high alpha cellulose pulp is also a suitable wood pulp fiber. The preferred pulp fiber is produced by chemical methods. Ground wood fibers, recycled or secondary wood pulp fibers, and bleached and unbleached wood pulp fibers can be used. Softwoods and hardwoods can be used. Suitable fibers are commercially available from a number of companies, including Weyerhaeuser Company. For example, suitable cellulosic fibers produced from southern pine that are usable with the present invention are available from Weyerhaeuser Company under the designations CF416, NF405, PL416, FR516, and NB416. Other suitable fibers include northern softwood and eucalyptus fibers.

The preparation of the mixed polymer composite fiber is a multistep process. First, the water-soluble carboxyalkyl cellulose and galactomannan polymer or glucomannan polymer are dissolved in water to provide a polymer solution. Cellulose fiber is then added and dispersed in the polymer solution. Then, a first crosslinking agent is added and mixed to obtain a mixed polymer composite gel formed by intermolecular crosslinking of water-soluble polymers intimately associated with dispersed cellulose fiber.

Suitable first crosslinking agents include crosslinking agents that are reactive towards hydroxyl groups and carboxyl groups. Representative crosslinking agents include metallic crosslinking agents, such as aluminum (III) compounds, titanium (IV) compounds, bismuth (III) compounds, boron (III) compounds, and zirconium (IV) compounds. The numerals in parentheses in the preceding list of metallic crosslinking agents refers to the valency of the metal.

The mixed polymer composite fiber is generated by rapid mixing of the mixed polymer composite gel with a water-miscible solvent. This fiber generated after first crosslinking has a high level of sliminess when hydrated and forms soft gels. Therefore this fiber cannot be used in absorbent applications without further treatment. The mixed polymer composite fiber thus obtained is further crosslinked (e.g., surface crosslinked) by treating with a second crosslinking agent in a water-miscible solvent containing water. The composition of water-miscible solvent and water is such that the fiber does not change its fiber form and return to gel state. The second crosslinking agent can be the same as or different from the first crosslinking agent.

The mixed polymer fibers are substantially insoluble in water while being capable of absorbing water. The fibers are rendered water insoluble by virtue of a plurality of non-permanent intra-fiber metal crosslinks. As used herein, the term "non-permanent intra-fiber metal crosslinks" refers to the nature of the crosslinking that occurs within individual modified fibers (i.e., intra-fiber) and among and between each fiber's constituent polymer molecules.

The fibers are intra-fiber crosslinked with metal crosslinks. The metal crosslinks arise as a consequence of an associative interaction (e.g., bonding) between functional groups on the fiber's polymers (e.g., carboxy, carboxylate, or hydroxyl groups) and a multi-valent metal species. Suitable multi-valent metal species include metal ions having a valency of three or greater and that are capable of forming interpolymer associative interactions with the functional groups of the polymer (e.g., reactive toward associative interaction with the carboxy, carboxylate, or hydroxyl groups). The polymers are crosslinked when the multi-valent metal species form interpolymer associative interactions with functional groups on the polymers. A crosslink may be formed intramolecularly within a polymer or may be formed intermolecularly between two or more polymer molecules within a fiber. The extent of intermolecular crosslinking affects the water solubility of the composite fibers (i.e., the greater the crosslinking, the greater the insolubility) and the ability of the fiber to swell on contact with an aqueous liquid.

The fibers include non-permanent intra-fiber metal crosslinks formed both intermolecularly and intramolecularly in the population of polymer molecules. As used herein, the term "non-permanent crosslink" refers to the metal crosslink formed with two or more functional groups of a polymer molecule (intramolecularly) or formed with two or more functional groups of two or more polymer molecules (intermolecularly). It will be appreciated that the process of dissociating and re-associating (breaking and reforming crosslinks) the multi-valent metal ion and polymer molecules is dynamic and also occurs during liquid acquisition. During water acquisition the individual fibers and fiber bundles swell and change to gel state. The ability of non permanent metal crosslinks to dissociate and associate under water acquisition imparts greater freedom to the gels to expand than if the gels were restrictively crosslinked by permanent crosslinks that do not have the ability to dissociate and re-associate. Covalent organic crosslinks, such as ether crosslinks, are permanent crosslinks that do not have the ability to dissociate and re-associate.

The fibers have fiber widths of from about 2 μm to about 50 μm (or greater) and coarseness that varies from soft to rough.

Figure 1:
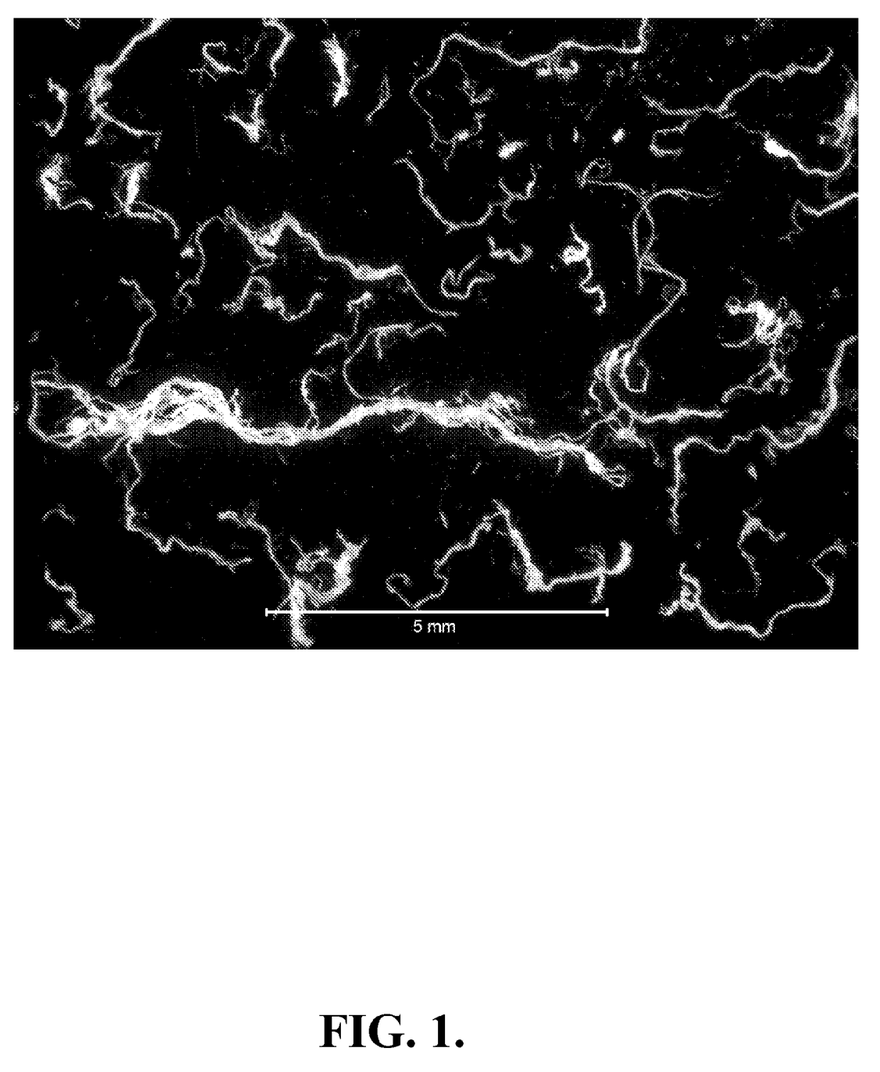
FIG. 1 is a photograph of representative mixed polymer composite fibers.
Figure 2:
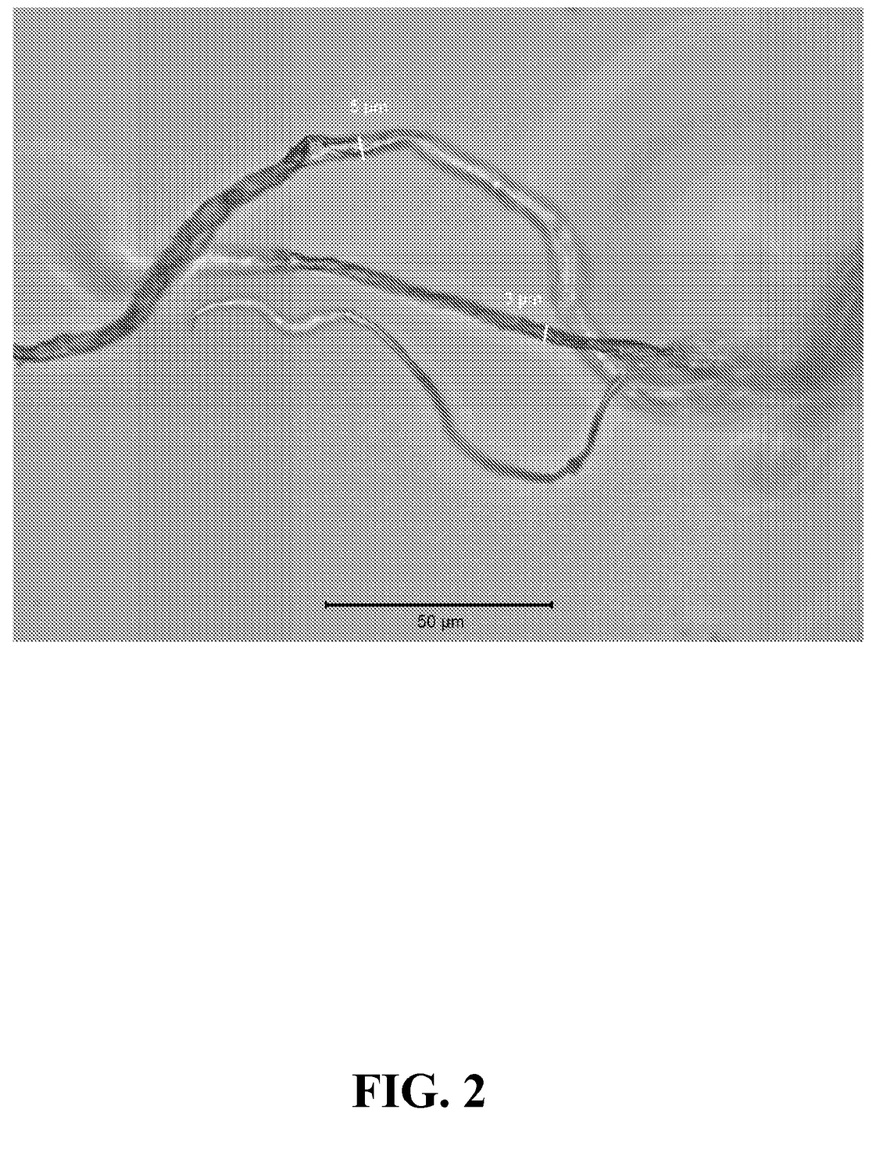
FIG. 2 is a photograph of representative mixed polymer composite fibers.
Figure 3:
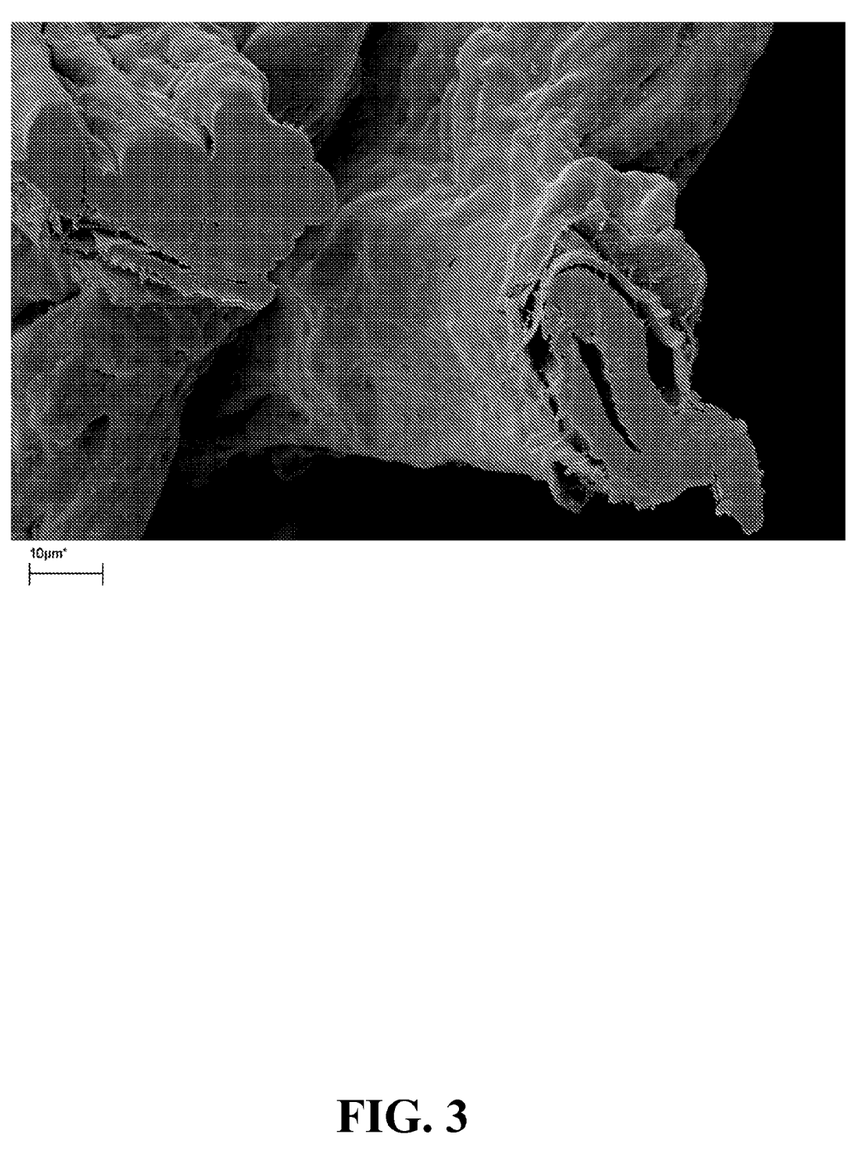
FIG. 3 is a scanning electron microscope photograph (1000x) of representative mixed polymer composite fibers (cross-section).

Representative mixed polymer composite fibers are illustrated in FIGS. 1-3. FIG. 1 is a photograph of representative mixed polymer composite fibers. FIG. 2 is a photograph of representative mixed polymer composite fibers. FIG. 3 is a scanning electron microscope photograph (1000x) of representative mixed polymer composite fibers (cross-sectional view) (Sample 4, Table 1).

The fibers are highly absorptive fibers. The fibers have a Free Swell Capacity of from about 30 to about 60 g/g (0.9% saline solution), a Centrifuge Retention Capacity (CRC) of from about 15 to about 35 g/g (0.9% saline solution), and an Absorbency Under Load (AUL) of from about 15 to about 30 g/g (0.9% saline solution).

The fibers can be formed into pads by conventional methods including air-laying techniques to provide fibrous pads having a variety of liquid wicking characteristics. For example, pads absorb liquid at a rate of from about 10 mL/sec to about 0.005 mL/sec (0.9% saline solution/10 mL application). The integrity of the pads can be varied from soft to very strong.

The mixed polymer composite fibers of the present invention are water insoluble and water swellable. Water insolubility is imparted to the fiber by intermolecular crosslinking of the mixed polymer molecules, and water swellability is imparted to the fiber by the presence of carboxylate anions with associated cations. The fibers are characterized as having a relatively high liquid absorbent capacity for water (e.g., pure water or aqueous solutions, such as salt solutions or biological solutions such as urine). Furthermore, because the mixed polymer fiber has the structure of a fiber, the mixed polymer composite fiber also possesses the ability to wick liquids. The mixed polymer composite fiber advantageously has dual properties of high liquid absorbent capacity and liquid wicking capacity.

Mixed polymer fibers having slow wicking ability of fluids are useful in medical applications, such as wound dressings and others. Mixed polymer fibers having rapid wicking capacity for urine are useful in personal care absorbent product applications. The mixed polymer fibers can be prepared having a range of wicking properties from slow to rapid for water and 0.9% aqueous saline solutions.

The mixed polymer composite fibers are useful as superabsorbents in personal care absorbent products (e.g., infant diapers, feminine care products and adult incontinence products). Because of their ability to wick liquids and to absorb liquids, the mixed polymer composite fibers are useful in a variety of other applications, including, for example, wound dressings, cable wrap, absorbent sheets or bags, and packaging materials.

In one aspect of the invention, methods for making mixed polymer composite fibers are provided.

In one embodiment, the method for making the mixed polymer composite fibers includes the steps of: (a) dissolving carboxyalkyl cellulose (e.g., mainly in salt form, with or without carboxyalkyl hemicellulose) and a galactomannan polymer or a glucomannan polymer in water to provide an aqueous polymer solution; (b) dispersing cellulose fibers in the polymer solution to provide an aqueous fiber dispersion; (c) treating the aqueous dispersion with a first crosslinking agent to provide a gel; (d) mixing the gel with a water-miscible solvent to provide composite fibers; and (e) treating the composite fibers with a second crosslinking agent to provide mixed polymer composite fibers. The mixed polymer composite fibers so prepared can be fiberized and dried.

In the process, a carboxyalkyl cellulose, a galactomannan polymer or a glucomannan polymer, and cellulose fibers are blended in water to provide an aqueous dispersion of cellulose in an aqueous polymer solution.

Suitable carboxyalkyl celluloses have a degree of carboxyl group substitution of from about 0.3 to about 2.5, and in one embodiment have a degree of carboxyl group substitution of from about 0.5 to about 1.5. In one embodiment, the carboxyalkyl cellulose is carboxymethyl cellulose. The aqueous dispersion includes from about 60 to about 99% by weight carboxyalkyl cellulose based on the weight of the product mixed polymer composite fiber. In one embodiment, the aqueous dispersion includes from about 80 to about 95% by weight carboxyalkyl cellulose based on the weight of mixed polymer composite fiber. Carboxyalkyl hemicellulose may also be present from about 0 to about 20 percent by weight based on the weight of mixed polymer composite fibers.

The aqueous dispersion also includes a galactomannan polymer or a glucomannan polymer. Suitable galactomannan polymers include guar gum, locust bean gum and tara gum. Suitable glucomannan polymers include konjac gum. The galactomannan polymer or glucomannan polymer can be from natural sources or obtained from genetically-modified plants. The aqueous dispersion includes from about 1 to about 20% by weight galactomannan polymer or glucomannan polymer based on the weight of the mixed polymer composite fiber, and in one embodiment, the aqueous dispersion includes from about 1 to about 15% by weight galactomannan polymer or glucomannan polymer based on the weight of mixed polymer composite fibers.

The aqueous dispersion also includes cellulose fibers, which are added to the aqueous polymer solution. The aqueous dispersion includes from about 2 to about 15% by weight cellulose fibers based on the weight of the mixed polymer composite fiber, and in one embodiment, the aqueous dispersion includes from about 5 to about 10% by weight cellulose fibers based on the weight of mixed polymer composite fibers.

In the method, the aqueous dispersion including the carboxyalkyl cellulose, galactomannan polymer or glucomannan polymer, and cellulose fibers is treated with a first crosslinking agent to provide a gel.

Suitable first crosslinking agents include crosslinking agents that are reactive towards hydroxyl groups and carboxyl groups. Representative crosslinking agents include metallic crosslinking agents, such as aluminum (III) compounds, titanium (IV) compounds, bismuth (III) compounds, boron (III) compounds, and zirconium (IV) compounds. The numerals in parentheses in the preceding list of metallic crosslinking agents refers to the valency of the metal.

Representative metallic crosslinking agents include aluminum sulfate; aluminum hydroxide; dihydroxy aluminum acetate (stabilized with boric acid); other aluminum salts of carboxylic acids and inorganic acids; other aluminum complexes, such as Ultrion 8186 from Nalco Company (aluminum chloride hydroxide); boric acid; sodium metaborate; ammonium zirconium carbonate; zirconium compounds containing inorganic ions or organic ions or neutral ligands; bismuth ammonium citrate; other bismuth salts of carboxylic acids and inorganic acids; titanium (IV) compounds, such as titanium (IV) bis(triethylaminato) bis(isopropoxide) (commercially available from the Dupont Company under the designation Tyzor TE); and other titanates with alkoxide or carboxylate ligands.

The first crosslinking agent is effective for associating and crosslinking the carboxyalkyl cellulose (with or without carboxyalkyl hemicellulose) and galactomannan polymer molecules intimately associated with the cellulose fibers. The first crosslinking agent is applied in an amount of from about 0.1 to about 20% by weight based on the total weight of the mixed polymer composite fiber. The amount of first crosslinking agent applied to the polymers will vary depending on the crosslinking agent. In general, the fibers have an aluminum content of about 0.04 to about 0.8% by weight based on the weight of the mixed polymer composite fiber for aluminum crosslinked fibers, a titanium content of about 0.10 to about 1.5% by weight based on the weight of the mixed polymer composite fiber for aluminum crosslinked fibers, a zirconium content of about 0.09 to about 2.0% by weight based on the weight of the mixed polymer composite fiber for zirconium crosslinked fibers, and a bismuth content of about 0.90 to about 5.0% by weight based on the weight of the mixed polymer composite fiber for bismuth crosslinked fibers.

The gel formed by treating the aqueous dispersion of cellulose fibers in the aqueous solution of the carboxyalkyl cellulose and galactomannan polymer with a first crosslinking agent is then mixed with a water-miscible solvent to provide composite fibers. Suitable water-miscible solvents include water-miscible alcohols and ketones. Representative water-miscible solvents include acetone, methanol, ethanol, isopropanol, and mixtures thereof. In one embodiment, the water-miscible solvent is ethanol. In another embodiment, the water-miscible solvent is isopropanol.

The volume of water-miscible solvent added to the gel ranges from about 1:1 to about 1:5 water (the volume used in making the aqueous dispersion of carboxyalkyl cellulose, galactomannan polymer, and cellulose fibers) to water-miscible solvent.

In the method, mixing the gel with the water-miscible solvent includes stirring to provide composite fibers. The mixing step and the use of the water-miscible solvent controls the rate of dehydration and solvent exchange under shear mixing conditions and provides for composite fiber formation. Mixing can be carried out using a variety of devices including overhead stirrers, Hobart mixers, British disintegrators, and blenders. For these mixing devices, the blender provides the greatest shear and the overhead stirrer provides the least shear. As noted above, fiber formation results from shear mixing the gel with the water-miscible solvent and effects solvent exchange and generation of composite fiber in the resultant mixed solvent.

In one embodiment, mixing the gel with a water-miscible solvent to provide composite fibers comprises mixing a 1 or 2% solids in water with an overhead mixer or stirrer. In another embodiment, mixing the gel with a water-miscible solvent to provide composite fibers comprises mixing 4% solids in water with a blender. For large scale production alternative mixing equipment with suitable mixing capacities are used.

Composite fibers formed from the mixing step are treated with a second crosslinking agent to provide the mixed polymer composite fibers (crosslinked fibers). The second crosslinking agent is effective in further crosslinking (e.g., surface crosslinking) the composite fibers. Suitable second crosslinking agents include crosslinking agents that are reactive towards hydroxyl groups and carboxyl groups. The second crosslinking agent can be the same as or different from the first crosslinking agent. Representative second crosslinking agents include the metallic crosslinking agents noted above useful as the first crosslinking agents.

The second crosslinking agent is applied at a relatively higher level than the first crosslinking agent per unit mass of fiber. This provides a higher degree of crosslinking on the surface of the fiber relative to the interior of the fiber. As described above, metal crosslinking agents form crosslinks between carboxylate anions and metal atoms or cellulose hydroxyloxygen and metal atoms. These crosslinks can migrate from one oxygen atom to another when the mixed polymer fiber absorbs water and forms a gel. However, having a higher level of crosslinks on the surface of the fiber relative to the interior provides a superabsorbent fiber with a suitable balance in free swell, centrifuge retention capacity, absorbency under load for aqueous solutions and lowers the gel blocking that inhibits liquid transport.

The second crosslinking agent is applied in an amount from about 0.1 to about 20% by weight based on the total weight of mixed polymer composite fibers. The amount of second crosslinking agent applied to the polymers will vary depending on the crosslinking agent. The product fibers have an aluminum content of about 0.04 to about 2.0% by weight based on the weight of the mixed polymer composite fiber for aluminum crosslinked fibers, a titanium content of about 0.1 to about 4.5% by weight based on the weight of the mixed polymer composite fiber for titanium crosslinked fibers, a zirconium content of about 0.09 to about 6.0% by weight based on the weight of the mixed polymer composite fiber for zirconium crosslinked fibers, and a bismuth content of about 0.09 to about 5.0% by weight based on the weight of the mixed polymer composite fiber for bismuth crosslinked fibers.

The second crosslinking agent may be the same as or different from the first crosslinking agent. Mixtures of two or more crosslinking agents in different ratios may be used in each crosslinking step.

The preparation of representative mixed polymer composite fibers are described in Examples 1-4.

The absorbent properties of the representative mixed polymer composite fibers are summarized in the Table 1. In Table 1, "% wgt total wgt, applied" refers to the amount of first crosslinking agent applied to the total weight of CMC and guar gum; "Second crosslinking agent/2 g" refers to the amount of second crosslinking agent applied per 2 g first crosslinked product; "CMC 9H4F" refers to a carboxymethyl cellulose commercially available from Hoechst Celanese under that designation; "KL-SW" refers to CMC made from northern softwood pulp; "LV-PN" refers to CMC made from west coast pine pulp; "NB416" refers to southern pine pulp fibers; and "PA Fluff" refers northern softwood pulp fibers; "i-PrOH" refers to isopropanol; "EtOH" refers to ethanol; "w wash" refers to washing the treated fibers with 100% ethanol or 100% isopropanol before drying; and "wo washing" refers to the process in which the treated fibers are not washed before drying.

Test Methods

Free Swell and Centrifuge Retention Capacities

The materials, procedure, and calculations to determine free swell capacity (g/g) and centrifuge retention capacity (CRC) (g/g) were as follows.

Test Materials:

Japanese pre-made empty tea bags (available from Drugstore.com, IN PURSUIT OF TEA polyester tea bags 93 mm×70 mm with fold-over flap. (http:www.mesh.ne.jp/tokiwa/)).

Balance (4 decimal place accuracy, 0.0001 g for air-dried superabsorbent polymer (ADS SAP) and tea bag weights); timer; 1% saline; drip rack with clips (NLM 211); and lab centrifuge (NLM 211, Spin-X spin extractor, model 776S, 3,300 RPM, 120 v).

Test Procedure:
1. Determine solids content of ADS.
2. Pre-weigh tea bags to nearest 0.0001 g and record.
3. Accurately weigh 0.2025 g+/−0.0025 g of test material (SAP), record and place into pre-weighed tea bag (air-dried (AD) bag weight). (ADS weight+AD bag weight=total dry weight).
4. Fold tea bag edge over closing bag.
5. Fill a container (at least 3 inches deep) with at least 2 inches with 1% saline.
6. Hold tea bag (with test sample) flat and shake to distribute test material evenly through bag.
7. Lay tea bag onto surface of saline and start timer.
8. Soak bags for specified time (e.g., 30 minutes).
9. Remove tea bags carefully, being careful not to spill any contents from bags, hang from a clip on drip rack for 3 minutes.
10. Carefully remove each bag, weigh, and record (drip weight).
11. Place tea bags onto centrifuge walls, being careful not to let them touch and careful to balance evenly around wall.
12. Lock down lid and start timer. Spin for 75 seconds.
13. Unlock lid and remove bags. Weigh each bag and record weight (centrifuge weight).

Calculations:

The tea bag material has an absorbency determined as follows:

Free Swell Capacity, factor=5.78
Centrifuge Capacity, factor=0.50
Z=Oven dry SAP wt (g)/Air dry SAP wt (g)
Free Capacity (g/g):

$$\frac{[(\text{drip wt (g)} - \text{dry bag wt (g)}) - (AD\,SAP\,\text{wt (g)})] - (\text{dry bag wt (g)} * 5.78)}{(AD\,SAP\,\text{wt (g)} * Z)}$$

Centrifuge Retention Capacity (g/g):

$$\frac{[\text{centrifuge wt (g)} - \text{dry bag wt (g)} - (AD\,SAP\,\text{wt (g)})] - (\text{dry bag wt (g)} * 0.50)}{(AD\,SAP\,\text{wt} * Z)}$$

Absorbency Under Load (AUL)

The materials, procedure, and calculations to determine AUL were as follows.

Test Materials:

Mettler Toledo PB 3002 balance and BALANCE-LINK software or other compatible balance and software. Software set-up: record weight from balance every 30 sec (this will be a negative number. Software can place each value into EXCEL spreadsheet.

Kontes 90 mm ULTRA-WARE filter set up with fritted glass (coarse) filter plate. clamped to stand; 2 L glass bottle with outlet tube near bottom of bottle; rubber stopper with glass tube through the stopper that fits the bottle (air inlet); TYGON tubing; stainless steel rod/plexiglass plunger assembly (71 mm diameter); stainless steel weight with hole drill through to place over plunger (plunger and weight=867 g); VWR 9.0 cm filter papers (Qualitative 413 catalog number 28310-048) cut down to 80 mm size; double-stick SCOTCH tape; and 0.9% saline.

Test Procedure:
1. Level filter set-up with small level.
2. Adjust filter height or fluid level in bottle so that fritted glass filter and saline level in bottle are at same height.
3. Make sure that there are no kinks in tubing or air bubbles in tubing or under fritted glass filter plate.
4. Place filter paper into filter and place stainless steel weight onto filter paper.
5. Wait for 5-10 min while filter paper becomes fully wetted and reaches equilibrium with applied weight.
6. Zero balance.
7. While waiting for filter paper to reach equilibrium prepare plunger with double stick tape on bottom.
8. Place plunger (with tape) onto separate scale and zero scale.
9. Place plunger into dry test material so that a monolayer of material is stuck to the bottom by the double stick tape.
10. Weigh the plunger and test material on zeroed scale and record weight of dry test material (dry material weight 0.15 g+/−0.05 g).
11. Filter paper should be at equilibrium by now, zero scale.
12. Start balance recording software.
13. Remove weight and place plunger and test material into filter assembly.
14. Place weight onto plunger assembly.
15. Wait for test to complete (30 or 60 min)
16. Stop balance recording software.

Calculations:

A=balance reading (g)*−1 (weight of saline absorbed by test material)
B=dry weight of test material (this can be corrected for moisture by multiplying the AD weight by solids %).

$$AUL(g/g)=A/B(g\ 1\%\ \text{saline}/1\ g\ \text{test material})$$

The following examples are provided for the purpose of illustrating, not limiting, the invention.

EXAMPLES

Example 1

The Preparation of Representative Mixed Polymer Composite Fibers

Aluminum Sulfate/Aluminum Sulfate Crosslinking

In this example, the preparation of representative mixed polymer composite fibers crosslinked with aluminum sulfate and aluminum sulfate is described.

A solution of CMC 9H4F (20.0 g OD) in 900 ml deionized (DI) water was prepared with vigorous stirring to obtain a solution. Guar gum (1.2 g) was dissolved in 50 ml DI water and mix well with the CMC solution. Fluff pulp (1.0 g NB416) was added and the solution stirred for one hour to allow complete mixing of the two polymers and cellulose fiber.

The polymer mixture was blended in the blender for 5 minutes. Weigh 1.2 g aluminum sulfate octadecahydrate and dissolve in 50 ml DI water. Transfer aluminum sulfate solution to the polymer solution and blend for 5 minutes to mix well. Leave the gel at ambient temperature (25° C.) for one hour. Transfer the gel into a Waring type blender with one liter of isopropanol. Mix for 1 minutes at low speed (gave a softer gel). Transfer the gel to a 5 gallon plastic bucket. Add two liters of isopropanol and mix rapidly with the vertical spiral mixer for 30 minutes. Filter and place the fiber in 500 ml of isopropanol and leave for 15 minutes. Filter the fiber and dry in an oven at 66° C. for 15-30 minutes.

Dissolve 0.32 g of aluminum sulfate octadecahydrate in 100 ml of deionized water and mix with 300 ml of denatured ethanol. To the stirred solution add 2.0 g of fiber, prepared as described above, and leave for 30 minutes at 25° C. Filter the fiber and press excess solution out. Filter and dry the product fiber at 66° C. for 15 minutes in an oven with fluffing. Free swell (60.6 g/g), centrifuge retention capacity (30.98 g/g), for 0.9% saline solution.

Example 2

The Preparation of Representative Mixed Polymer Composite Fibers

Aluminum Sulfate/Aluminum Sulfate Crosslinking

In this example, the preparation of representative mixed polymer composite fibers crosslinked with aluminum sulfate and aluminum sulfate is described.

A solution of CMC 9H4F (40.0 g OD) and 2.4 g guar gum in 900 ml deionized water was prepared in a Hobart mixer to obtain a viscous polymer solution in 2 hours. Initially mix at speed one and increase speed to two and finally to three. Fluff pulp (4.0 g PA) in 50 ml water was added and mixed at speed three for one hour.

Dissolve 1.2 g aluminum sulfate octadecahydrate in 50 ml DI water. Transfer the crosslinker solution to the polymer solution and mix well in the Hobart mixer (initially at speed one and then gradually increasing the speed to three as the crosslinker solution becomes absorbed into the gel (one hour)). Transfer the gel into a Waring type blender with one liter of isopropanol. Mix for 2 minutes at low speed (gave a softer gel). Add two liters of isopropanol and blend at low speed and powerstat setting of 70 for one minute. Filter and place the fiber in one liter of isopropanol and in the blender and blend at low power and powerstat setting of 70 for one minute. Filter the fiber and dry in an oven at 66° C. for 15-30 minutes.

Dissolve 0.20 g of aluminum sulfate octadecahydrate in 100 ml of deionized water and mix with 300 ml of isopropanol. To the stirred solution add 2.0 g of fiber, prepared as described above, and leave for 15 minutes at 25° C. Filter the fiber and press excess solution out. Filter and dry the fiber at 66° C. for 15 minutes in an oven with fluffing. Free swell (52.04 g/g), centrifuge retention capacity (21.83 g/g), AUL at 0.3 psi (23.73 g/g) for 0.9% saline solution.

Example 3

The Preparation of Representative Mixed Polymer Composite Fibers

Aluminum Sulfate/Aluminum Sulfate Crosslinking

In this example, the preparation of representative mixed polymer composite fibers crosslinked with aluminum sulfate and aluminum sulfate is described.

A solution of Kamloops softwood (DS=0.94) CMC (20.0 g OD) in 900 ml deionized water was prepared with vigorous stirring to obtain a solution. Guar gum (1.2 g) was dissolved in 50 ml DI water and mixed well with the CMC solution. Fluff pulp (2.0 g NB416) was added and the mixture stirred for one hour to allow complete mixing of the two polymers and cellulose fiber.

The mixture was blended in the blender for 5 minutes. Weigh 0.8 g aluminum sulfate octadecahydrate and dissolve in 50 ml DI water. Transfer aluminum sulfate solution to the polymer solution and blend for 5 minutes to mix well. Leave the gel at ambient temperature (25° C.) for one hour. Transfer the gel into a Waring type blender with one liter of denatured ethanol. Mix for 2 minutes at low speed (gave a softer gel), then add 2 liters of ethanol and blend at low power and power stat setting of 70 for one minute. Filter and place the fiber in 500 ml of ethanol and stir for 15 minutes. Filter the fiber and dry in an oven at 66° C. for 15 minutes.

Dissolve 0.28 g of aluminum sulfate octadecahydrate in 50 ml of deionized water and mix with 150 ml of denatured ethanol. To the stirred solution add 2.0 g of fiber, prepared as described above, and leave for 30 minutes at 25° C. Filter the fiber and press excess solution out. Filter and dry the fiber at 66° C. for 15 minutes in an oven with fluffing. Free swell (57.61 g/g), centrifuge retention capacity (25.45 g/g), AUL at 0.3 psi (22.26 g/g) for 0.9% saline solution.

Example 4

The Preparation of Representative Mixed Polymer Composite Fibers

Aluminum Sulfate/Aluminum Sulfate Crosslinking

In this example, the preparation of representative mixed polymer composite fibers crosslinked with aluminum sulfate and aluminum sulfate is described.

A solution of Longview pine (DS=0.98) CMC (40.0 g OD) and 2.4 g guar gum in 900 ml deionized water was prepared with gradual increase in mixing speed in a Hobart mixer. Fluff pulp (4.0 g NB416) in 50 ml DI water was added and mixed to allow complete mixing of the two polymers and cellulose fiber.

Dissolve 1.2 g aluminum sulfate octadecahydrate in 50 ml DI water. Transfer aluminum sulfate solution to the polymer mixture and mix well. Leave the gel at ambient temperature (25° C.) for one hour. Transfer the gel into a Waring type blender with one liter of isopropanol. Mix for 2 minutes at low speed and 90 power stat setting (gave a softer gel), and then add 2 liters of isopropanol and blend at low power and power stat setting of 60 for one minute. Filter and place the fiber in one liter of isopropanol and stir for 15 minutes. Filter the fiber and dry in an oven at 66° C. for 15 minutes. Screen out small fraction below 300 micrometer size.

Dissolve 0.22 g of aluminum sulfate octadecahydrate in 50 ml of deionized water and mix with 150 ml of isopropanol. To the stirred solution add 2.0 g of fiber, prepared as described above, and leave for 40 minutes at 25° C. Filter the fiber and press excess solution out. Filter and air dry the fiber at 25° C. Free swell (56.77 g/g), centrifuge retention capacity (28.95 g/g), AUL at 0.3 psi (22.66 g/g) for 0.9% saline solution.

TABLE 1

Compositions and Absorbent Properties of Precipitated Superabsorbent Fiber From Crosslinked Aqueous Mixtures of CMC, Galactomannan, and Cellulose

| Sample | CMC | Guar Gum (wgt % total wgt) | Cellulose (wgt % total wgt) | First crosslinking agent (wgt % total wgt, applied) | Second crosslinking agent/2 g | Fiber forming solvent | Free Swell (g/g) | CRC (g/g) | ZAUL (g/g) |
|---|---|---|---|---|---|---|---|---|---|
| 1 | CMC 9H4F | 5.2 | NB416, 4.38% | $Al_2(SO_4)_3$ 2.63% | 0.16 g $Al_2(SO_4)_3$ wo washing | i-PrOH | 60.6 | 30.98 | |
| 2 | CMC 9H4F | 5.2 | NB416, 4.38% | $Al_2(SO_4)_3$ 2.63% | 0.16 g $Al_2(SO_4)_3$ wo washing | i-PrOH | 46.87 | 9.68 | |
| 3 | CMC 9H4F | 5.0 | NB416, 8.43% | $Al_2(SO_4)_3$ 1.68% $B(OH)_3$ 0.4% | 0.13 g $Al_2(SO_4)_3$ wo washing | i-PrOH | 39.99 | 14.42 | |
| 4 | CMC 9H4F | 5.0 | NB416, 8.47% | $Al_2(SO_4)_3$ 1.69% | 0.17 g $Al_2(SO_4)_3$ wo washing | i-PrOH | 45.62 | 13.31 | |
| 5 | CMC 9H4F | 5.1 | PA Fluff, 8.5% | $Al_2(SO_4)_3$ 1.27% | 0.10 g $Al_2(SO_4)_3$ wo washing | i-PrOH | 52.04 | 21.83 | 23.73 |
| 6 | CMC 9H4F | 5.1 | PA Fluff, 8.5% | $Al_2(SO_4)_3$ 1.27% | 0.12 g $Al_2(SO_4)_3$ wo washing | i-PrOH | 38.37 | 8.08 | |
| 7 | KL-SW | 5.0 | NB416, 8.47% | $Al_2(SO_4)_3$ 1.69% | 0.14 g $Al_2(SO_4)_3$ w wash | EtOH | 57.61 | 25.45 | 22.26 |
| 8 | KL-SW | 5.0 | NB416, 8.47% | $Al_2(SO_4)_3$ 1.69% | 0.16 g $Al_2(SO_4)_3$ w wash | EtOH | 48.87 | 19.47 | 19 |
| 9 | KL-SW | 5.0 | NB416, 8.47% | $Al_2(SO_4)_3$ 1.69% | 0.18 g $Al_2(SO_4)_3$ w wash | EtOH | 49.14 | 13.76 | |
| 10 | KL-SW | 5.0 | NB416, 8.47% | $Al_2(SO_4)_3$ 1.69% | 0.16 g $Al_2(SO_4)_3$ w wash | EtOH | 44.4 | 9.04 | |
| 11 | KL-SW | 5.0 | NB416, 8.47% | $Al_2(SO_4)_3$ 1.69% | 0.15 g $Al_2(SO_4)_3$ w wash | EtOH | 55.96 | 20.73 | 25.26 |
| 12 | LV-PN | 5.1 | PA Fluff, 8.5% | $Al_2(SO_4)_3$ 1.27% | 0.14 g $Al_2(SO_4)_3$ w wash | i-PrOH | 49.82 | 19.41 | |
| 13 | LV-PN | 5.1 | PA Fluff, 8.5% | $Al_2(SO_4)_3$ 1.27% | 0.12 g $Al_2(SO_4)_3$ w wash | i-PrOH | 54.48 | 23.2 | |
| 14 | LV-PN | 5.1 | PA Fluff, 8.5% | $Al_2(SO_4)_3$ 1.27% | 0.10 g $Al_2(SO_4)_3$ w wash | i-PrOH | 55.51 | 27.43 | |
| 15 | LV-PN | 5.1 | PA Fluff, 8.5% | $Al_2(SO_4)_3$ 1.27% | 0.08 g $Al_2(SO_4)_3$ w wash | i-PrOH | 57.62 | 31.2 | |
| 16 | LV-PN | 5.1 | PA Fluff, 8.5% | $Al_2(SO_4)_3$ 1.27% | 0.11 g $Al_2(SO_4)_3$ w wash | i-PrOH | | | |

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for making crosslinked fibers, comprising:
    (a) dispersing cellulose fibers in an aqueous solution comprising a carboxyalkyl cellulose and a galactomannan polymer or a glucomannan polymer in water to provide an aqueous fiber dispersion;
    (b) treating the aqueous dispersion with a first crosslinking agent to provide a gel;
    (c) mixing the gel with a water-miscible solvent to provide composite fibers; and
    (d) treating the composite fibers with a second crosslinking agent to provide crosslinked fibers.

2. The method of claim 1 further comprising fiberizing the crosslinked fibers to provide fiberized crosslinked fibers.

3. The method of claim 2 further comprising drying the fiberized crosslinked fibers to provide dried crosslinked fibers.

4. The method of claim 1, wherein the carboxyalkyl cellulose has a degree of carboxyl group substitution of from about 0.3 to about 2.5.

5. The method of claim 1, wherein the carboxyalkyl cellulose is carboxymethyl cellulose.

6. The method of claim 1, wherein the galactomannan polymer is selected from the group consisting of guar gum, locust bean gum, and tara gum.

7. The method of claim 1, wherein the glucomannan polymer is konjac gum.

8. The method of claim 1, wherein the aqueous dispersion comprises from about 60 to about 99 percent by weight carboxyalkyl cellulose based on the total weight of crosslinked fibers.

9. The method of claim 1, wherein the aqueous dispersion comprises from about 1 to about 20 percent by weight galactomannan polymer or glucomannan polymer based on the total weight of crosslinked fibers.

10. The method of claim 1, wherein the aqueous dispersion comprises from about 2 to about 15 percent by weight cellulose fibers based on the total weight of crosslinked fibers.

11. The method of claim 1, wherein the first crosslinking agent is a crosslinking agent reactive toward carboxyl groups.

12. The method of claim 1, wherein the first crosslinking agent is a crosslinking agent reactive toward hydroxyl groups.

13. The method of claim 1, wherein the first crosslinking agent is selected from the group consisting of aluminum (III) compounds, titanium (IV) compounds, bismuth (III) compounds, boron (III) compounds, and zirconium (IV) compounds.

14. The method of claim 1, wherein the first crosslinking agent is present in an amount from about 0.1 to about 20 percent by weight based on the total weight of cross linked fibers.

15. The method of claim 1, wherein the water-miscible solvent is an alcohol.

16. The method of claim 1, wherein the water-miscible solvent is selected from the group consisting of methanol, ethanol, isopropanol, and mixtures thereof.

17. The method of claim 1, wherein the volume of water-miscible solvent to water is from about 1:1 to about 1:5.

18. The method of claim 1, wherein mixing the gel with the water-miscible solvent comprises stirring to provide fibers.

19. The method of claim 1, wherein the second crosslinking agent is selected from the group consisting of aluminum (III) compounds, titanium (IV) compounds, bismuth (III) compounds, boron (III) compounds, and zirconium (IV) compounds.

20. The method of claim 1, wherein the second crosslinking agent is present in an amount from about 0.1 to about 20 percent by weight based on the total weight of crosslinked fibers.

* * * * *